Jan. 7, 1930.　　　　J. W. STRIPPEL　　　　1,742,735
UTILITY TRUCK
Filed Oct. 21, 1927
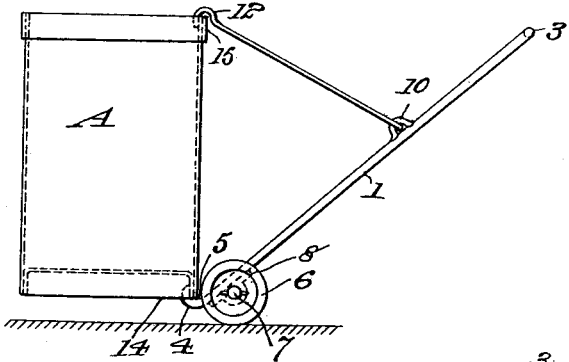
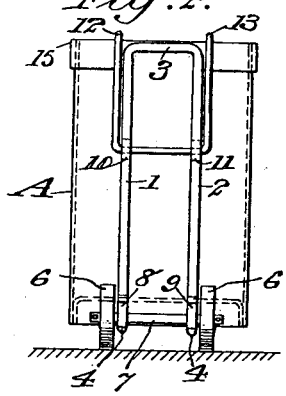
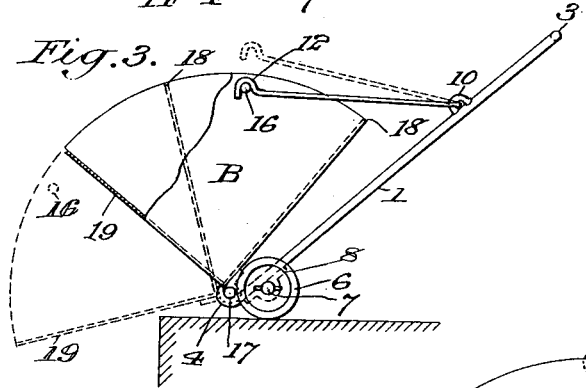
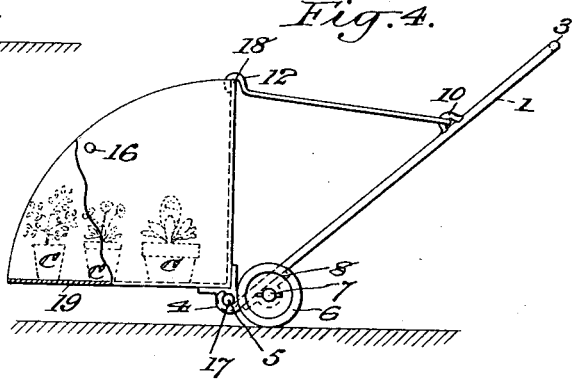
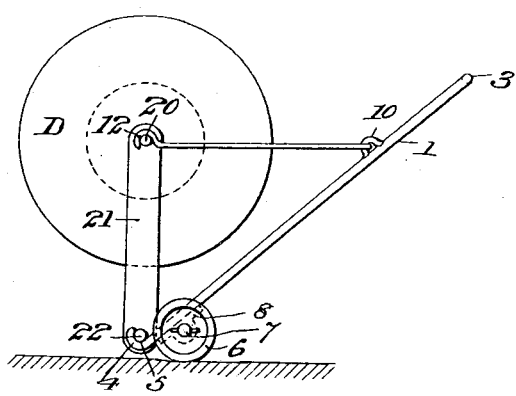
INVENTOR
John W. Strippel
BY
ATTORNEYS Patented Jan. 7, 1930

1,742,735

UNITED STATES PATENT OFFICE

JOHN W. STRIPPEL, OF EL MORA, NEW JERSEY

UTILITY TRUCK

Application filed October 21, 1927. Serial No. 227,772.

This invention relates to a utility truck of a type similar to those commonly in use for the moving of baggage, boxes, barrels and the like.

It has for an object to provide such a truck which may be adapted to a greater variety of uses than the trucks heretofore known.

Another object is to provide such a truck which, while having the adaptability just mentioned, is yet of the simplest possible construction, in order that it may be manufactured cheaply, and operated easily with a minimum liklihood of getting out of order.

A further object consists in providing certain improvements in the form, construction, and arrangement of the several parts whereby the above named, and other objects, may effectively be attained.

A practical embodiment of the invention is represented in the accompanying drawings in which:

Fig. 1 represents a side elevation of the device having an ash can in position thereon.

Fig. 2 represents an end elevation of the same.

Fig. 3 represents a side elevation of the device having a dump cart member in position thereon; the dumping position of the latter being indicated by dotted lines, and a part being broken away.

Fig. 4 represents a side elevation of the device having the dump cart member arranged in position to serve as a platform truck, part of said member being broken away.

Fig. 5 represents a side elevation of the device having a hose reel mounted thereon.

In the drawings the numerals 1, 2 designate the side frame portions of a U-shaped main body member having a handle portion 3. The lower ends of the side frame portions 1, 2 are each bent to form a foot 4, providing a crotch 5 within the bend. Wheels 6, 6 are mounted in any convenient manner on an axle 7 which extends transversely of the frame and is attached to the side portions 1, 2 thereof by means of shaft supports 8, 9, preferably, as shown, at points as near to the foot as possible in order that the center of gravity of the truck and load may be adjacent the wheel axles to relieve strain on the user. Pivoted to the side frame portions 1, 2 at 10, 11 is a U-shaped bail having hooks 12, 13 formed in its ends.

As shown in Figs. 1 and 2, the truck may be used to carry an ash can or the like, designated by the letter A, by engaging the feet 4 under the bottom rim 14 of the can and hooking the ends 12, 13 of the bail onto the top edge 15 of the can. It will be noted that the hooks 12, 13 are so shaped as to prevent the edge of the can from moving either forward or backward, and it will also be evident that cans of varying sizes may be accommodated with equal facility.

Fig. 3 shows the truck assembled with a cart member B. The latter is provided with lugs 16 adapted to be engaged by the hooks 12, 13, and with a bearing element 17 adapted to fit in the crotches 5, whereby the member may be secured normally in the carrying position shown in solid lines. When it is desired to empty the dump cart member, the hooks 12, 13 are lifted out of engagement with the lugs 16 and the member is permitted to pivot about its bearing element 17 to a dumping position such as that indicated in dotted lines in the figure.

If it is desired to use the device as a platform truck, the member B may be secured in the position shown in Fig. 4 by hooking the ends 12, 13 of the bail over an edge 18 of the said member so that the side 19 thereof will assume a substantially horizontal position suitable for carrying various objects, such as flower pots, indicated in dotted lines at C, C, C.

The truck may also be used as a convenient mounting for a hose reel D, as shown in Fig. 5. The reel D is carried upon an axle 20 the ends of which project sufficiently to be engaged by the hooks 12, 13. The axle 20 passes through the upper ends of side support members 21, while the lower ends of the members 21 are traversed by a rod 22 adapted to fit within the crotches 5.

It is evident from the foregoing that this truck is capable of a variety of uses including many not herein described. It is also clear that the structure of the truck enables it to be made cheaply and used easily with little danger of its getting out of order, and in these as well as other respects it is a considerable improvement over the trucks heretofore known.

It will be understood that various changes may be resorted to in the form, construction, material and arrangement of the several parts, without departing from the spirit and scope of my invention, and hence I do not intend to be limited to the details herein shown and described, except as they may be included in the claims.

What I claim is:

1. A device of the character described comprising, a main body composed of a single piece of material bent in the form of a U and including side frame portions and foot portions, said foot portions being upturned to form bearings adjacent the lower ends of the side frame portions, and a bail composed of a single piece of material bent in the form of a U, the closed end of the bail being pivotally mounted on the side frame members intermediate the ends of the latter, the foot portions of the body and the open ends of the bail being adapted to hook, respectively, under and over the lower and upper portions of a carrying member for supporting said member in carrying position.

2. In combination, a device of the character described comprising, a main body composed of a single piece of material bent in the form of a U and including side frame portions and foot portions, said foot portions being upturned to form bearings adjacent the lower ends of the side frame portions, and a bail composed of a single piece of material bent in the form of a U, the closed end of the bail being pivotally mounted on the side frame members intermediate the ends of the latter, and a carrying member, said member being adapted for pivotal engagement in the said bearings and for engagement with the bail at a plurality of points whereby the member may be supported and carried in different positions.

In testimony, that I claim the foregoing as my invention, I have signed my name this 15th day of October, 1927.

JOHN W. STRIPPEL.